United States Patent
Pause

(10) Patent No.: US 7,571,758 B2
(45) Date of Patent: Aug. 11, 2009

(54) BUILDING CONDITIONING TECHNIQUE USING PHASE CHANGE MATERIALS IN THE ROOF STRUCTURE

(76) Inventor: Barbara Hildegard Pause, 7161 Christopher Ct., Longmont, CO (US) 80503

( * ) Notice: Subject to any disclaimer, the term of this patent is extended or adjusted under 35 U.S.C. 154(b) by 982 days.

(21) Appl. No.: 11/031,200

(22) Filed: Jan. 6, 2005

(65) Prior Publication Data

US 2005/0178524 A1    Aug. 18, 2005

Related U.S. Application Data

(60) Provisional application No. 60/535,601, filed on Jan. 10, 2004.

(51) Int. Cl.
*F28D 17/00* (2006.01)
*F28D 19/00* (2006.01)

(52) U.S. Cl. .................. 165/10; 165/47; 165/53; 52/404.1

(58) Field of Classification Search .......... 165/10, 165/47, 53; 428/34, 116; 52/404.1
See application file for complete search history.

(56) References Cited

U.S. PATENT DOCUMENTS

| | | | | | |
|---|---|---|---|---|---|
| 3,167,159 | A | * | 1/1965 | Bovenkerk | 52/404.1 |
| 3,960,205 | A | * | 6/1976 | Laing | 165/53 |
| 5,532,039 | A | * | 7/1996 | Payne et al. | 428/116 |
| 6,613,404 | B2 | * | 9/2003 | Johnson | 428/34 |

* cited by examiner

*Primary Examiner*—Ljiljana (Lil) V Ciric

(57) ABSTRACT

A method and corresponding structure using phase change materials to control the heat flux into and out of a building through the roof. To control the heat flux through the roof, phase change materials are arranged in two locations inside the roof structure. A first phase change material is used in the upper part of the roof above the insulation. A second phase change material is used in the lower part of the roof below the insulation. The melting point of the first phase change material is higher than the crystallization point of the second phase change material.

5 Claims, 2 Drawing Sheets

BUILDING CONDITIONING TECHNIQUE USING PHASE CHANGE MATERIALS IN THE ROOF STRUCTURE

CROSS-REFERENCES TO RELATED APPLICATIONS

This application claims priority of U.S. Provisional Patent Application Ser. No. 60/535,601 filed Jan. 10, 2004 entitled "Non-woven composite building materials with thermo-regulating properties".

BACKGROUND OF THE INVENTION

Considering the thermal performance of a building, the roof is a significant weak point. During the day, most of the heat provided by solar radiation penetrates through the roof into the building. On hot summer days, the living space underneath the roof often overheats which leads to a substantial decrease in thermal comfort. Overnight, a substantial amount of the heat stored inside the building during the day is lost through the roof. On cold winter days, this significant heat loss through the roof has a large influence on the heating demands of the building.

The problem can be solved by the application of phase change material in roof structures. Phase change material is a highly-productive thermal storage medium which possesses the ability to change its physical state within a certain temperature range. When the melting temperature is obtained during a heating process, the phase change from the solid to the liquid state occurs. During this melting process, the phase change material absorbs and stores a large amount of latent heat. The temperature of the phase change material remains nearly constant during the entire process. When the phase change is complete, a continuing heating process leads to a further temperature increase and the absorption of a much smaller amount of sensible heat. In a cooling process of the phase change material, the stored latent heat is released into the environment in a certain temperature range, and a reverse phase change from the liquid to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat absorbed in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Thus, water needs to be heated as long as its temperature rises from 1° C. to about 84° C. in order to absorb the same amount of heat which is absorbed during the melting process of ice.

In addition to ice (water), more than 500 natural and synthetic phase change materials are known. These materials differ from one another in their phase change temperature ranges and their latent heat storage capacities.

Currently, crystalline alkyl hydrocarbon phase change materials having different chain lengths are used in textile applications of phase change materials and more specifically in garment applications. Characteristics of these phase change materials are summarized in Table 1.

TABLE 1

Crystalline alkyl hydrocarbons

| Crystalline alkyl hydrocarbons | Formula | Melting temperature, ° C. | Crystallization temperature, ° C. | Latent heat storage capacity, J/g |
|---|---|---|---|---|
| Heneicosane | $C_{21}H_{44}$ | 40.5 | 35.9 | 213 |
| Eicosane | $C_{20}H_{42}$ | 36.1 | 30.6 | 247 |
| Nonadecane | $C_{19}H_{40}$ | 32.1 | 26.4 | 222 |
| Octadecane | $C_{18}H_{38}$ | 28.2 | 25.4 | 244 |
| Heptadecane | $C_{17}H_{36}$ | 21.7 | 16.5 | 213 |
| Hexadecane | $C_{16}H_{34}$ | 16.7 | 12.2 | 237 |

The crystalline alkyl hydrocarbons are either used in technical grades with a purity of approximately 95%; or they are blended with one another in order to cover specific phase change temperature ranges. The crystalline alkyl hydrocarbons are nontoxic, non-corrosive, and non-hygroscopic. The thermal behavior of these phase change materials remains stable under permanent use. Crystalline alkyl hydrocarbons are byproducts of petroleum refining and, therefore, inexpensive. A disadvantage of crystalline alkyl hydrocarbons is their low resistance against ignition.

Salt hydrates are alloys of inorganic salts and water. The most attractive properties of salt hydrates are the comparatively high latent heat storage capacities, the high thermal conductivities and the small volume change during melting. They are mostly non-combustible which makes them specifically attractive for building applications. Salt hydrates often show an incongruent melting behavior as a result of a lack in reversible melting and freezing making them unsuitable for permanent use. Salt hydrates with reversible melting and freezing characteristics are summarized in Table 2.

TABLE 2

Salt hydrates

| Salt hydrates | Melting temperature, ° C. | Latent heat storage capacity, J/g |
|---|---|---|
| Calcium cloride hexahydrate | 29.4 | 170 |
| Lithium nitrate trihydrate | 29.9 | 296 |
| Sodium hydrogen phosphate dodecahydrate | 36.0 | 280 |
| Sodium thiosulfate pentahydrate | 49.0 | 200 |
| Lithium acetate dihydrate | 56.0 | 270 |
| Magnesium chloride tetrahydrate | 58.0 | 180 |

There are several thermal effects which can be obtained by a phase change material application in a certain product, such as:

A cooling effect, caused by latent heat absorption of the phase change material.

A heating effect, caused by latent heat release of the phase change material.

A thermo-regulating effect, resulting from either latent heat absorption or latent heat release of the phase change material.

The efficiency of each of these effects is determined by the latent heat storage capacity of the phase change material, the phase change temperature range and the structure of the carrier system.

The total latent heat storage capacity of the phase change material in a product depends on the phase change material's specific latent heat storage capacity and its quantity. In order to obtain a successful phase change material application, the phase change temperature range and the application temperature range need to correspond.

Phase change materials have been suggested for the use in building constructions. For instance, U.S. Pat. No. 4,587,279 describes the direct addition of phase change material into the wet mix stage of concrete. However, this approach has lead to a substantial reduction of the concrete's mechanical properties.

U.S. Pat. No. 6,230,444 reports a building conditioning technique where phase change material is used in floors and ceilings of rooms in order to minimize the floor to ceiling temperature gradient of the room. However, in this case only the thermal comfort of the specific room equipped with the phase change material can be improved. The thermal comfort of adjacent rooms located in the same building can only be improved if each of them is equipped with phase change material.

SUMMARY OF THE INVENTION

The invention pertains to a building conditioning technique where phase change material is used to control the heat flux into and out of a residential or a commercial building through the roof components. Two locations have been selected to be appropriate for a phase change material application in roof structures. In a first arrangement underneath the roof tiles, the phase change material should absorb excess heat provided by solar radiation mainly during hot summer days. The phase change material located in this first arrangement underneath the roof tiles should absorb heat when its temperature rises above approximately 50° C. In a second arrangement above the dry wall (which the ceiling consists of), the phase change material shall absorb latent heat generated in the living space underneath the roof during the day and shall release the stored heat overnight when the temperature drops below a certain value, in order to provide a temporary, additional thermal insulation during cold winter nights. The latent heat release of the phase change material used in this second arrangement should take place preferably in a temperature range between 10° C. and 20° C.

The phase change materials are incorporated into an elastomeric compound which is applied to one or both sides of a carrier fabric currently used for a water vapor barrier or an underlay in common roof systems. In a preferred embodiment of the technique of the present invention, the phase change materials are non-combustible salt hydrates which allows them to meet fire-resistant requirements of building materials.

DETAILED DESCRIPTION OF THE INVENTION

It has been discovered that the incorporation of temperature stabilizing phase change material in roof structures of buildings can improve the thermal performance of residential and commercial buildings significantly. In its roof application, the phase change material shall provide a thermo-regulating effect which controls the heat flux into and out of the building through the roof components. For instance, the phase change material shall absorb part of the heat provided by the solar radiation during the day. The heat absorption by the phase change material reduces the heat flux into the building. Especially on hot summer days, the thermal comfort inside the building will be enhanced significantly as a result of the phase change material's heat absorption feature.

On the other side, the latent heat release of the phase change material could also be used to control the heat flux out of the building through the roof components, which would be particularly beneficial during a cold winter night. Applying phase change material to the building's envelope, specifically using it in its roof, the overall heating and air-conditioning demands of the facility are expected to be reduced. Thus, the building becomes more energy efficient.

Figure 1:
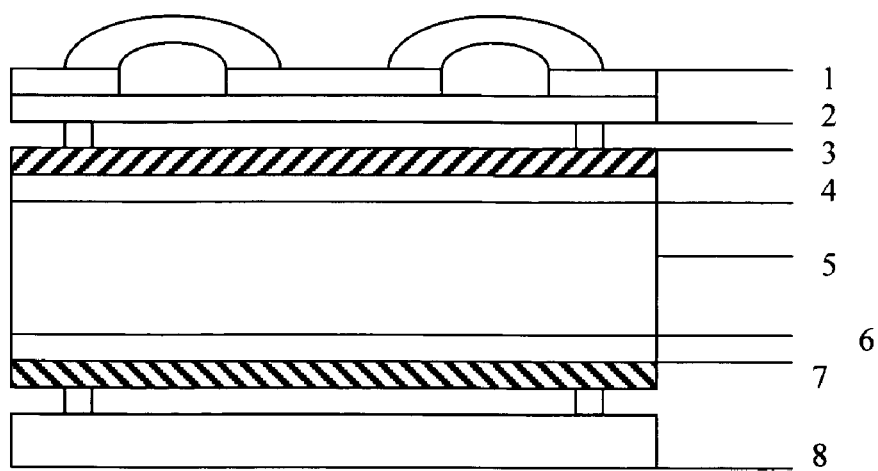
FIG. 1 is a sectional view of a roof structure where phase change material is arranged in the two selected locations.

There are several different designs for roofs of residential or commercial building. One of the most common roof designs is shown in FIG. 1. In the roof construction shown in FIG. 1, the space between the dry wall (8) which creates the ceiling of the living space underneath the roof and the rooftop comprising rooftiles (1) mounted on the wooden boarding (2) is filled with an arrangement consisting of the underlay (4), the thermal insulation layer (5) and the water vapor barrier layer (6).

The water vapor barrier layer (6) prevents moisture generated in the living space underneath the roof from penetrating into the thermal insulation layer (5) and other parts of the roof construction. Beside the water vapor barrier function, the design of this layer also protects against air leakage. The underlay (4) attached to the adjacent side of the thermal insulation layer (5) is water resistant and, therefore, prevents rain or snow from penetrating into the roof. However, the water vapor resistance of the underlay (4) is low enough to avoid the risk of condensation forming on its underside which would lead to an increase of the moisture content in the thermal insulation layer (5). An increase in the moisture content of the thermal insulation material decreases its thermal resistance and, therefore, lowers its thermal performance.

Based on thermal tests in various roof structures and computer modeling, two separate locations were determined where a phase change material arrangement provides a suitable thermal function. In the first arrangement, the phase change material should be located in the upper part of the roof construction between the roof tiles (1) mounted on the wooden boarding (2) and the thermal insulation package consisting of the underlay (4), the thermal insulation layer (5) and the water vapor barrier (6). Most preferably, the phase change material layer (3) shall be arranged adjacent to the underlay (4) as shown in FIG. 1. A common non-woven underlay material made, for instance, of spun-bonded, high-density polypropylene or polyethylene could function as a support structure to which the phase change material embedded in a containment structure will be attached. The purpose of the phase change material arrangement in the upper part of the roof structure is the heat protection on hot summer days. The phase change material will absorb the heat provided by solar radiation which has penetrated through the roof tiles and the wooden boarding as soon as the temperature of the phase change material and its surrounding containment structure reaches a certain value. As long as the latent heat absorption of the phase change material takes place, the temperature of the phase change material and its surrounding containment structure will remain nearly constant. Consequently, the heat flux into the building will not increase during the day as it usually does. As a result, the temperature in the living space underneath the roof will not rise in the way it would without the application of the phase change material.

Furthermore, the phase change material arrangement in the upper part of the roof construction prevents that the heat provided by solar radiation penetrates into other roof components such as the thermal insulation layer where a removal of the heat would be difficult to realize. Furthermore, the selected location of the phase change material ensures that the stored latent heat could be completely removed overnight and, therefore, the phase change material could be recharged.

In the second arrangement, the phase change material should be located in the lower part of the roof construction between the dry wall (8) and the thermal insulation package consisting of the underlay (4), the thermal insulation layer (5) and the water vapor barrier (6). Most preferably, the phase change material layer (7) shall be arranged adjacent to the water vapor barrier (6) as shown in FIG. 1. A common non-woven vapor barrier material made, for instance, of spun-bonded, high-density polypropylene or polyethylene could function as a support structure to which the phase change material embedded in a containment structure will be attached. The purpose of this phase change material arrangement is a temporary, additional thermal insulation effect on cold winter nights. In this case, the phase change material will store the heat generated in the living space underneath the roof during the day after penetrating through the dry wall. Overnight, when the temperature of the phase change material and its surrounding containment structure drops under a certain value, the latent heat will be released.

The phase change material arrangement directly above the dry wall ensures that the heat, which is generated in the living space underneath the roof during the day and usually rises to the ceiling, is preserved and available to use in order to reduce the heat flux through the roof overnight. In addition, the latent heat absorption, without a substantial rise in the ceiling's temperature during the day, leads to a reduction in the temperature gradient between the living space's floor and ceiling which enhances the room's thermal comfort substantially. On the other side, the phase change material arrangement underneath the thermal insulation layer (5) is advantageous. The latent heat released by the phase change material will first penetrate into the insulation layer from where it slowly disappears.

Applying phase change material to both locations in the roof structure leads to the maximum thermal benefit. However, phase change material can also be applied to either one of the both locations. In southern geographical locations there the heat protection and, hence the thermal comfort is the main concern the phase change material should be attached to the first location in the roofs upper part. On the other side, in northern geographical locations there the building's thermal insulation especially during the winter time is the main concern the phase change material shall be attached to the second location in the lower part of the roof.

The phase change materials used in the both arrangement need to be carefully selected in order to obtain the desired thermal benefits. Temperature development studies and computer simulations have been used in order to determine the temperature ranges in which the latent heat absorption and the latent heat release should take place in each of the arrangements. Preferably, the phase change material used in the location underneath the roof tiles (3) should absorb latent heat in a temperature range between 55° C. and 65° C. and should release latent heat in a temperature range between 45° C. and 55° C. On the other side, the phase change material located above the dry wall (7) shall absorb latent heat in a temperature range between 30° C. and 35° C. and shall release latent heat in a temperature range between 15° C. and 20° C. Because of the differences in the phase change temperature ranges between the two phase change materials they will both act separately without interferences.

Most preferably, the phase change materials used in both locations in the roof structure are non-combustible salt hydrates. Using non-combustible salt hydrates in the technique of the present invention allows for compliance with fire-resistant requirements of building materials. For instance, lithium acetate dihydrate and magnesium cloride tetrahydrate are suitable phase change materials for an application in the upper part of the roof (3). On the other side, calcium cloride hexahydrate and lithium nitrate trihydrate are phase change materials which are suitable for an application in the lower part of the roof (7).

Crystalline alkyl hydrocarbons might be used in the technique of the present invention in conjunction with flame-retardant additives. For instance, mixtures of tetracosane and hexacosane are suitable crystalline alkyl hydrocarbons phase change materials for an application in the upper part of the roof (3). On the other side, mixtures of hexadecane and heptadecane are crystalline alkyl hydrocarbon phase change materials which are suitable for an application in the lower part of the roof (7).

The selected salt hydrates or crystalline alkyl hydrocarbons can be durably contained in an elastomer whereby the phase change materials are cross-linked into the elastomer's structure. Finely-divided phase change materials emulsified or dispersed in the elastomer's structure do not flow out of the elastomer structure while in a liquid stage. The composition remains stable under substantial temperature variation over a long service life.

Such elastomeric materials can comprise, by way of example and not by limitation silicone rubber, acrylate rubber, butyl rubber, nitrile rubber or chloroprene rubber. Furthermore, thermoplastic elastomers with, for instance, fluorine, polyurethane or polyester as basic components are also suitable containment structures for the phase change material application.

In the manufacturing of the prevailing building material with incorporated phase change material, the phase change material is thoroughly mixed into the components creating the elastomeric matrix. Then, the elastomeric compound with the phase change material incorporated therein can be topically applied to a carrier fabric by knife coating and there the system will be cured. In another embodiment, the elastomeric compound with the phase change material will be formed into a film which is then laminated to the carrier fabric. Most preferably, the carrier fabrics are non-wovens made of spun-bonded, high-density polypropylene or polyethylene currently used for underlays and water vapor barriers used in roof structures. The carrier fabrics support the mechanical stability of the composite. The phase change materials may be incorporated into the elastomeric matrix in a weight portion of up to 60 wt. % based on the material's total weight.

Figure 2:
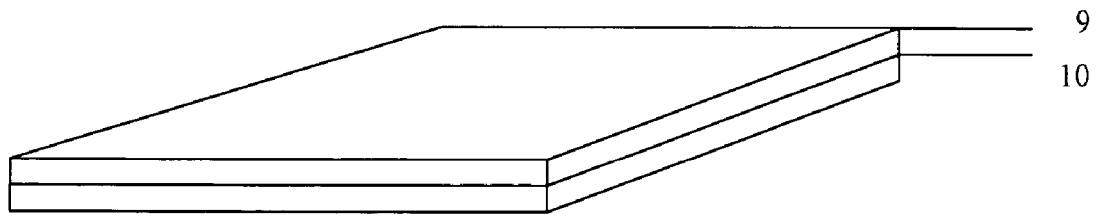
FIG. 2 is a perspective view of a composite material consisting of a composition of a carrier fabric and an elastomeric compound which is applied to one side of the carrier fabric where phase change material is incorporated into the elastomeric compound.
Figure 3:
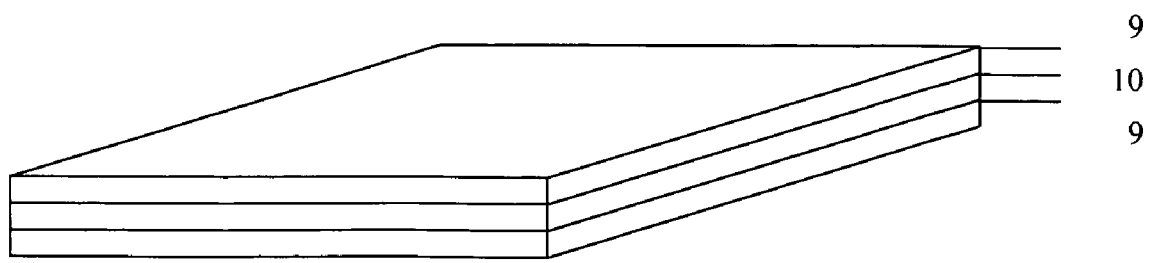
FIG. 3 is a perspective view of a composite material consisting of a composition of a carrier fabric and an elastomeric compound which is applied to both sides of the carrier fabric and where phase change material is incorporated into the elastomeric compound.

FIG. 2 and FIG. 3 show two suitable arrangements of the elastomeric compound with the incorporated phase change material (9) in a composite with a carrier fabric (10), i.e. the elastomeric compound (9) is applied either to one or to both sides of the carrier fabric (10).

Figure 4:
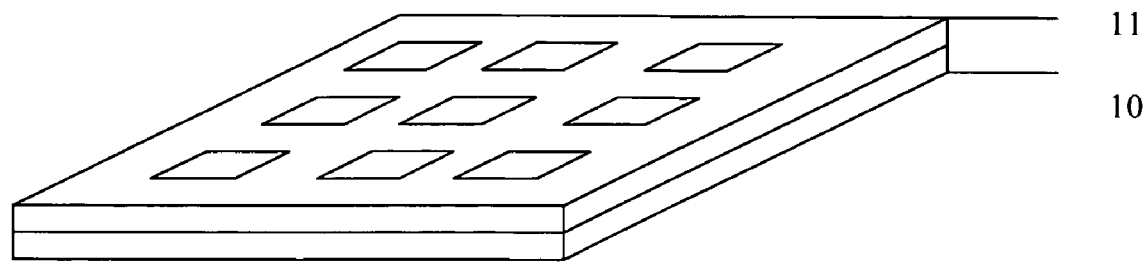
FIG. 4 is a perspective view of a composite material consisting of a composition of a carrier fabric and an elastomeric compound which is applied to one side of the carrier fabric in a mesh-like form where phase change material is incorporated into the elastomeric compound.

The necessary latent heat storage capacity of phase change materials arranged in the two locations has been determined from the solar radiation incidence, the heat absorption of the roof components of model buildings, and the heat flux through the roof into and out of the buildings. For instance, the heat protection on hot summer days may require a latent heat storage capacity of about 360 kJ/m$^2$. Based on a latent heat storage capacity of 240 J/g of a selected phase change material a phase change material quantity of about 1.5 kg/m$^2$ would be necessary. Applying approximately 40% phase change material to a selected elastomeric compound results in a thickness of a non-woven composite material used as underlay of about 2 mm based on a closed layer of the elastomeric material with phase change material. Because of the requirement that an underlay structure has to provide a sufficient water vapor transfer, the elastomeric material with the phase change material is applied to the non-woven carrier material in a mesh-like form. FIG. 4 shows an arrangement where the elastomeric compound (11) with the incorporated phase change material is applied to one side of the carrier fabric (10) in such a mesh-like design. The reduction in surface area due to the mesh-like design leads to an increase in the material thickness to about 3 mm.

On the other side, in order to prevent a substantial heat loss through the roof during cold winter nights, a latent heat storage capacity of about 240 J/m$^2$ may be required. Using a phase change material with a latent heat storage capacity of 240 J/g leads to a phase change material quantity of about 1 kg/m$^2$. Applying approximately 40% phase change material to the elastomeric compound results in a thickness of the water vapor barrier material of about 1.5 mm. In this arrangement the elastomeric compound with phase change material covers the surface of the non-woven carrier material completely. The elastomeric compound itself provides the required water vapor barrier and air tightness. Thus, the polymeric film usually applied to the spun bonded non-woven material the water vapor barrier consists of can be replaced by the elastomeric compound with phase change material.

The thermal effects provided by the phase change materials applied to the composite building materials have been proven to be durable in more than thousand thermo-cycles. The composite materials with incorporated phase change material possess a high tensile strength, a durable elasticity, and a high dimensional stability. The phase change material application in composite materials used for building enclosures will lead to a better thermal comfort inside such buildings and to substantial energy savings.

Figure 5:
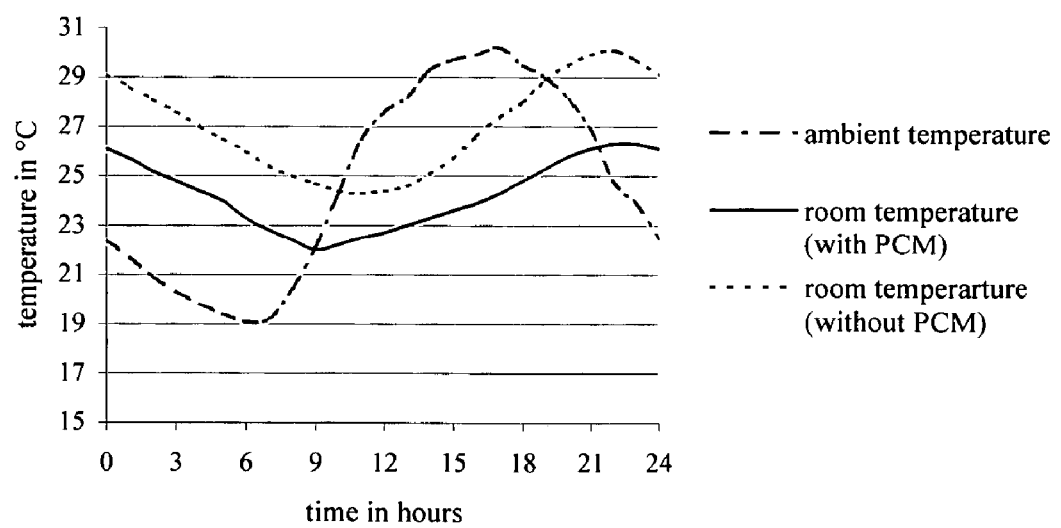
FIG. 5 is a graphical representation of the temperature development in the living space underneath the roof of a model building during high ambient temperatures on a hot summer day where composite materials with and without phase change material have been applied to the roof structure.

In order to quantify the thermal comfort improvement, the temperature development in the living space underneath the roof of the residential building with and without the phase change material application in the roof was determined. The calculations are based on real measurements of the ambient temperature and the room temperature on hot summer days and the expected heat transfer effects through the roof. FIG. 5 shows the ambient temperature development and the temperature development inside the room for each version (with and without PCM) during the course of an entire day.

When phase change material is applied to the roof of the building in the first location underneath the roof tiles, the temperature increase in the living space of the second floor can be reduced significantly. In the evening hours, temperature differences of up to 4 degrees C. are obtained when comparing the buildings with and without phase change material. Furthermore, due to the prevention of the heat flux increase through the roof into the building during the day caused by the latent heat absorption of the phase change material, the room temperature can be maintained in a comfort range between 22° C. and 26° C. also on a very hot summer day without the use of an external air-conditioning system.

The annual heating demand of a model building was calculated to be approximately 12,000 kWh. With the PCM application in the roof the heating demand can be reduced by 25% to about 9,000 kWh. Furthermore, considering the use of an air-conditioning system during the summer months, the overall energy savings could rise further up to about 40%.

Presently preferred embodiments of the present invention have been described with a degree of particularity. It should be understood that this description has been made by way of preferred example, and that the invention is defined by the scope of the claims.

What is claimed is:

1. A method for controlling heat flux into and out of a building, the method comprising:
   providing a roof including thermal insulation;
   incorporating a first phase change material in an upper part of the roof above the thermal insulation; and
   incorporating a second phase change material in a lower part of the roof below the thermal insulation:
   wherein said melting temperature of said first phase change material is higher than the crystallization temperature of said second phase change material.

2. The method of controlling heat flux into and out of a building according to claim 1, wherein the melting temperature of said first phase change material is higher than the melting temperature of said second phase change material.

3. The method of controlling heat flux into and out of a building according to claim 1, wherein the melting temperature of said first phase change material ranges from 50° C. up to 70° C. and the crystallization temperature of said second phase change material ranges from 10° C. up to 20° C.

4. A roof structure containing at least a dry wall, a thermal insulation package including a water vapor barrier, a thermal insulation layer and an underlay, and roof tiles mounted on boarding, said roof structure further comprising:
   a first phase change material having a melting temperature and fixedly positioned above the thermal insulation package adjacent to the underlay; and
   a second phase change material having a crystallization temperature and fixedly position below the thermal insulation package adjacent to the water vapor barrier,
   wherein said melting temperature of said first phase change material is higher than the crystallization temperature of said second phase change material.

5. The roof structure according to claim 4, wherein the roof tiles are free of phase change material.

* * * * *